Figure 1:
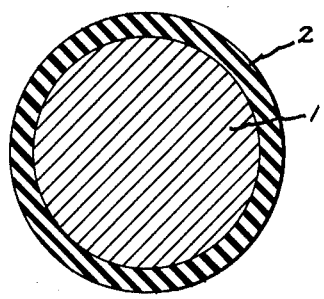

Dec. 8, 1964     F. F. HOLUB ETAL     3,160,604
WHOLLY AROMATIC POLY-M-PHENYLENE TEREPHTHALATES
Filed June 1, 1960

Inventors:
Fred F. Holub,
Simon W. Kantor,
by James H. Underwood
Their Agent.

United States Patent Office 3,160,604
Patented Dec. 8, 1964

3,160,604
WHOLLY AROMATIC POLY-m-PHENYLENE
TEREPHTHALATES
Fred F. Holub, Scotia, and Simon W. Kantor, Schenectady, N.Y., assignors to General Electric Company, a corporation of New York
Filed June 1, 1960, Ser. No. 33,130
10 Claims. (Cl. 260—47)

This invention relates to synthetic polymeric compositions, and more particularly, to a superpolyester formed of m-phenylene terephthalate units interspersed with from 0 to 30 mole percent of p-phenylene terephthalate units based on the total m-phenylene terephthalate and p-terephthalate units, and still more particularly, to such superpolyesters having an intrinsic viscosity of at least 0.5.

Although superpolyesters are well known in the art, superpolyesters have had to have an aliphatic component in the polymer chain in order for them to be obtained with the high molecular weight characteristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters, for example, the impact, flexible and tensile strength properties, are much greater and furthermore, the films and fibers which can be formed from the superpolyesters can be structurally oriented by cold drawing techniques to produce films and fibers which are much more flexible and of higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points. Therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer, or a very brittle polymer of no utility, depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide, to produce 1,4-bis(β-hydroxyethoxy)benzene. These compounds are esterified by reaction with a dibasic acid or a dibasic acid chloride, or by an ester interchange reaction to form its corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed, due to the introduction of the aliphatic groups into the polymeric chain. Any attempt to react dihydric phenol with a dicarboxylic acid or the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or carry out the reaction without the use of solvents always failed, again because thermal decomposition took precedence over the formation of the high molecular weight polymer.

Figure 2:
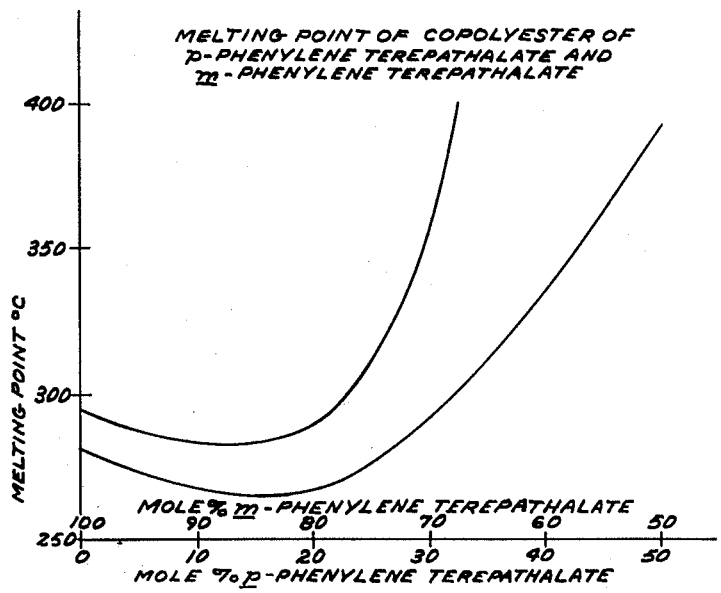

Our invention may be better understood by reference to the following description, taken in connection with the following drawings, in which:

FIG. 1 is a cross-sectional view of an insulated electrical conductor within the scope of the present invention; and FIG. 2 is a plot showing how the melting point of the various products within the scope of the present invention varies with the ratio of m-phenylene terephthalate to p-phenylene terephthalate units.

We have discovered that superpolyesters formed of m-phenylene terephthalate units interspersed with from 0 to 30 mole percent p-phenylene terephthalate units which can also be described as supercopolyester of m-phenylene terephthalate and p-phenylene terephthalate can be made which have intrinsic viscosities of at least 0.5. Surprisingly, the melting point is, at most, only slightly higher than the corresponding, lower molecular weight polyesters, but the physical properties are increased tremendously. These superpolyesters have a molecular chain in which the m-phenylene terephthalate units are interspersed with any p-phenylene terephthalate units present. As will be readily apparent, in any one polymer molecule, there can be either m-phenylene terephthalate units or m-phenylene terephthalate units interspersed with the p-phenylene terephthalate units. When there is a mixture of both units, they can appear in ordered, random, or block arrangement of each such units; the arrangement and ratio of units will be dependent on the order of reaction and ratio of reactants. For example, if a supercopolyester of m-phenylene terephthalate and p-phenylene terephthalate is to be made, i.e., a superpolyester formed of m-phenylene terephthalate units and p-phenylene terephthalate units, terephthaloyl chloride may be reacted first with resorcinol and then with hydroquinone, or the terephthaloyl chloride may be reacted with a mixture of resorcinol and hydroquinone. For reasons explained later, it is not desirable to react the terephthaloyl chloride first with hydroquinone and then with resorcinol.

The superpolyesters of the present invention are made up of repeating structural units having the formula:

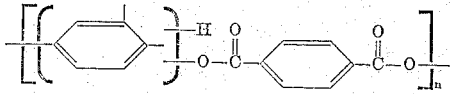

wherein $n$ is an integer representing the number of units in the molecule and, for our superpolyesters, is probably at least 50 or higher. However, intrinsic viscosity is a better measure of molecular weight due to the uncertainties of determining the actual value of $n$, which, at best is an average value of approximate magnitude.

Intrinsic viscosity is well known in the art and is described in detail in many places in published literature, for example, on page 309 of the book by P. J. Flory, "Principles of Polymer Chemistry," Cornell University Press, Ithaca, New York, 1953. An intrinsic viscosity of at least 0.5, which in the case of our polymers is usually measured at 75° C. while dissolved in 2,4,6-trichlorophenol, is necessary in order for the polymers to be used for the making of films and fibers having any utility. Polyesters having intrinsic viscosities below this value lack the necessary properties to form useful films and fibers as indicated by their brittleness which increases as the intrinsic viscosity decreases.

The preparation of these superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides, brominated diphenyl oxides, chlorinated naphthalenes and brominated naphthalenes. The reaction of dihydric phenols with aromatic dicarbonyl halides while dissolved in this special class of solvents is more particularly described and claimed in our copending application Serial No. 33,124, filed concurrently herewith and assigned to the same assignee as the present invention.

The above method is particularly applicable for the production of fusible, thermoplastic, linear superpolyesters formed of m-phenylene terephthalate units interspersed with from 0 to 30 mole percent of p-phenylene terephthalate units based on the total m-phenylene terephthalate and p-phenylene terephthalate units, and especially to these superpolyesters having an intrinsic viscosity of at least 0.5. These superpolyesters are prepared by the reaction of resorcinol and hydroquinone if it is to be present in the polymer, with a terephthaloyl halide in a 1-step reaction, or by the reaction of resorcinol first with a terephthaloyl halide and further reacted with hydroquinone if p-phenylene terephthalate units are to be present in the polymer molecule while dissolved in one of the above-named solvents. Preferably, the terephthaloyl halide is terephthaloyl chloride. The solution is heated to a temperature in the range of 270° C. up to the reflux temperature of the solution until the evolution of the hydrogen halide is at least substantially complete. In the 2-stage process of producing our compositions, the hydroquinone is added after substantially all of the terephthaloyl halide has reacted with the resorcinol and the heating continued to evolve the additional hydrogen halide.

Alternatively, we have found that these superpolyesters may be prepared by another but less suitable method involving the use of the same specific group of solvents. This method involves the ester interchange reaction between a di-(monobasic acid)ester of the resorcinol and hydroquinone and terephthalic acid. In this reaction, the terephthalic acid and the diesters of resorcinol and hydroquinone, e.g., the diacetate, dipropionate, dibenzoate, etc., esters of hydroquinone are dissolved in the solvent if a 1-stage process is being used, and heated to a temperature in the range of 240° to 350° C. under reflux conditions which allow distillation of the monobasic acid moiety of the hydroquinone and resorcinol diester, e.g., acetic acid if the esters are p-phenylene diacetate (hydroquinone diacetate) and m-phenylene diacetate (resorcinol diacetate). In the 2-stage process, resorcinol diacetate may be reacted first with the terephthalic acid followed by the addition of the hydroquinone diacetate. In contrast to the 30 to 120 minutes required for the reaction of the acid halide with resorcinol and hydroquinone, the above ester interchange reaction requires an extremely long time, for example, from 6 to 10 hours. The products are dark colored and, because of the extended reaction time at elevated temperature, contain solvent reaction products especially if the solvent is halogenated. Furthermore, the ester interchange reaction is incapable of removing all of the monobasic acid ester groups and those still remaining in the polymer reduce the high temperature stability of the polymer. The monobasic acid ester groups which are not removed are also a measure of a low molecular weight, since they occupy terminal groups which are potential chain propagating sites. This method is, however, capable of producing superpolyesters formed of m-phenylene terephthalate units interspersed with p-phenylene terephthalate units having an intrinsic viscosity in the range of 0.5 to 0.7. For best products, we prefer to use the reaction of resorcinol and hydroquinone with terephthaloyl chloride. Such a reaction is capable of producing transparent, water white, tough, strong products having intrinsic viscosities in the range of 0.5 to 2.0 and higher. Either the 1-stage or 2-stage process may be used. However, for those compositions containing the maximum or near maximum amount of p-phenylene terephthalate groups, e.g., 20 to 30 mole percent, we prefer to use the 2-stage process in order to minimize the formation of large blocks of p-phenylene terephthalate units within the polymer molecule, since the effect of such large blocks is to increase the melting point considerably and decrease the solubility in comparison to a superpolyester of the same composition without such blocks. On the other hand, when the amount of p-phenylene terephthalate units is in the minimum range, e.g., 0 to 10%, we prefer to use the 1-stage process of preparing our superpolyesters.

As far as we are aware, it has been impossible to produce a superpolyester from terephthalic acid and either hydroquinone or resorcinol. Whenever either of these two products has been described in the prior art, they have been described as insoluble and infusible. For the first time, we have been able to produce these superpolyesters from terephthalic acid and resorcinol having a high intrinsic viscosity and solubility in certain specific solvents, and in a form which can be heat and pressure shaped into a wide variety of useful articles. We have further discovered that this superpolyester can be modified by also including p-phenylene terephthalate units in the polymer molecule up to a total of 30 mole percent, and still retain the solubility and fusibility characteristics of the superpolyester. Such soluble, fusible compositions, which we describe as the superpolyester, are formed of m-phenylene terephthalate units interspersed with from 0 to 30 mole percent p-phenylene terephthalate units based on the total m-phenylene terephthalate and p-phenylene terephthalate units, and have never been described before. Surprisingly enough, these copolymers have melting points lower than either of the two components. This was indeed unexpected in view of the extremely high melting point of p-phenylene terephthalate. This effect is illustrated graphically in FIG. 2. In determining the points from which these curves were drawn, a standard melting point apparatus using a heated metal block was used. The lower curve represents where the edges of the mass of powdered resin became clear and the top curve represents where the entire mass of resin became clear without application of pressure. The area between the two curves represents the temperatures which can be used to shape our compositions under heat and pressure, e.g., by molding, extrusion, etc., into useful articles. Normally, we prefer to use temperatures at, near, or slightly higher than the top curve.

Other related superpolyesters are disclosed and claimed in our copending applications, as follows, filed concurrently herewith and assigned to the same assignee as the present invention.

(1) Linear superpolyesters of p-phenylene isophthalate having an intrinsic viscosity of at least 0.5 wherein the p-phenylene radicals are selected from the group consisting of the p-phenylene, monochloro-p-phenylene and dichloro-p-phenylene radicals, disclosed and claimed in our copending application Serial No. 33,131.

(2) Linear superpolyesters formed of p-phenylene isophthalate units interspersed with p-phenylene terephthalate units, the intrinsic viscosity of the polyester being at least 0.5 and the isophthalate content being a leas 60 mole percent of the total isophthalate and terephthalate content of the superpolyester, disclosed and claimed in our copending application Serial No. 33,125, now U.S. 3,036,990.

(3) Linear superpolyesters formed of p-phenylene isophthalate units interspersed with p,p'-biphenylene isophthalate units, the intrinsic viscosity of the superpolyester being at least 0.5 and the p-phenylene isophthalate units being at least 40 mole percent of the total p-phenylene isophthalate and p,p'-biphenylene isophthalate units in the superpolyester, disclosed and claimed in our copending application Serial No. 33,126, now U.S. 3,026,991.

(4) Chlorine-containing p-phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene and dichloro-p-phenylene groups, disclosed and claimed in our copending application Serial No. 33,127.

(5) Linear, superpolyesters having an intrinsic viscosity of at least 0.5 and formed of the four structural units (1) p-phenylene units, (2) units selected from the group consisting of o-phenylene units, m-phenylene units and o,o'-biphenylene units, (3) isophthalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128, now U.S. 3,036,992.

In order that those skilled in the art may understand our invention, the following examples are given by way of illustration and not by way of limitation.

EXAMPLE 1

A mixture of 11.2 grams (0.102 mole) of resorcinol, 20.3 grams (0.100 mole) of redistilled terephthaloyl chloride, and 209.0 grams of redistilled mixed trichlorobiphenyls was stirred and heated under a nitrogen atmosphere. A clear, homogeneous solution was obtained at 140° C. After 9 minutes, the temperature of the reaction reached 335° C. The polymerization was allowed to continue for an additional 3 minutes at 330°–335° C. to form a viscous solution. The mixture was allowed to cool whereby the polymer precipitated at 185° C. The polymer was separated by adding acetone and filtering. The solid was washed 3 times with one-liter portions of acetone, filtered and dried to yield 20.8 grams (86%) of white poly-m-phenylene terephthalic melting at 281°–295° C. A sample of this polymer had an intrinsic viscosity of 0.66 in 2,4,6-trichlorophenol at 75° C.

Another sample of poly-m-phenylene terephthalate was purified by reprecipitation, washed thoroughly with acetone and analyzed. The elementary analysis agreed with the empirical formula $C_{14}H_8O_4$.

Calculated: C, 70.0; H, 3.3. Found: C, 69.5; H, 3.4.

Strong, flexible, transparent films of poly-m-phenylene terephthalate were obtained by pressing this polymer between aluminum foil at temperatures of 350°–380° C. and pressures of 1000–2000 lbs./square inch. The films were transparent whether the hot films were quenched in cold water or allowed to cool slowly in air. The density of water-quenched films was 1.3375 at 25° C. while the density of air-cooled samples was 1.3385–1.3395 grams/cc. at 25° C. This small difference in density indicates that very little crystallization occurred on slow-cooling the polymer. In fact, the hot films remained amorphous and completely transparent when allowed to cool in the mold from 350° C. down to room temperature, over an extended period of time.

An amorphous film was prepared by pressing a one-gram sample of poly-m-phenylene terephthalate at 355° C. under 1000 lbs./square inch pressure and allowing the film to air-cool. This sample was transparent, flexible and quite tough. It had a tensile strength of 11,000 lbs./square inch pressure, an elongation of 31% and a yield point at 10,060 lbs./square inch.

Although poly-m-phenylene terephthalate crystallizes with difficulty, it could be induced to crystallize by heating at 200° C. After 774 hours at 200° C., the density gradually increased from an original value of 1.3390 grams/cc. for the amporphous film to 1.3750 grams/cc. for the crystallized sample. The resulting crystalline film was still transparent and tough.

Amorphous transparent films and tapes can also be prepared by extrusion from the melt. In addition, wires of nickel-coated copper can be insulated by direct extrusion of molten poly-m-phenylene terephthalate at 350° C. through a die onto the wire. By this means an insulated conductor can be covered with a tough, flexible, adherent covering of polymer.

Fibers of poly-m-phenylene terephthalate or of the copolymers of poly-m-phenylene terephthalate can be prepared by drawing fibers from the melt or by extruding the melt through a die to form monofilaments. The resulting fibers are tough and flexible and can be oriented and crystallized at 200°–250° C. to increase their strength and toughness.

EXAMPLE 2

This example illustrates the preparation of copolymers of poly-m-phenylene-p-phenylene terephthalate. These polymers are best prepared by a two-step process which minimizes the formation of highly insoluble and intractable blocks of poly-p-phenylene terephthalate. A mixture of 8.40 grams (0.0764 mole) of redistilled resorcinol, 20.30 grams (0.100 mole) of redistilled terephthaloyl chloride, and 200.0 grams of redistilled mixed trichlorobiphenyl was stirred and heated under nitrogen. At 140° C., a homogeneous solution was obtained. After 15 minutes, the solvent was refluxing and the temperature was 320° C. The mixture was heated 7 minutes at 320°–324° C. and then allowed to cool. When it had cooled to 280° C., 2.80 grams (0.0254 mole) of hydroquinone was added and the heating was resumed. The reaction was finally heated for 10 minutes at a temperature of 310°–320° C. At the end of this time, a viscous solution was obtained which was allowed to cool. The polymer precipitated at 200° C. to give a thick, pasty mixture. The polymer was washed twice with two liters of acetone, chopped up in a blender and rewashed with additional acetone. It was filtered and dried to give 21.5 grams (89% yield) of polyphenylene-p-phenylene terephthalate as a white polymer, melting at 295°–336° C. A sample of this polymer had an intrinsic viscosity of 0.95 in 2,4,6-trichlorophenol at 75° C. Tough, flexible, transparent films of this polymer were obtained by pressing one-gram samples at 415° C. under pressures of 200 lbs./square inch between aluminum foil. The films were flexible and transparent whether the polymer was quenched in cold water or allowed to cool slowly from the pressing temperature.

Table I shows a summary of the properties of the copolymers made by essentially duplicating the method described above except for varying the mole ratio of hydroquinone to resorcinol as indicated in the first column of the table.

Table I

| Mole Ratio of | | Intrinsic Viscosity of Polymer [η] | M. P., °C | Yield percent | Precipitation Temp. °C |
|---|---|---|---|---|---|
| H [a] | R [a] | | | | |
| 10 | [b] 90 | [c] 0.60 | 273–362 | 89 | [b] 160 |
| 19.6 | 80.4 | [c] 0.53 | 261–284 | 95 | 190 |
| 25 | 75 | [c] 0.95 | 295–336 | 89 | 220 |
| 32.4 | 67.6 | [c] 1.23 | 331–386 | 79 | 260 |

[a] H=Hydroquinone; R=Resorcinol.
[b] This polymer was synthesized in mixed monochlorobiphenyl.
[c] Determined in 2,4,6-trichlorophenol at 75° C.

The copolymers listed in Table I were pressed into films at 350°–425° C. and 1000–2000 lbs./square inch pressure. In this manner, tough, flexible, transparent films were obtained from all of the polymers in the table.

Polymers we have prepared containing a high mole ratio of p-phenylene terephthalate in the copolymer composition have very broad melting point ranges as indicated by FIG. 2, which make them less useful since they are more difficult to process.

EXAMPLE 3

This example shows how closely related chlorinated solvents cannot be used to produce materials having the desirable properties of our products.

A mixture of 11.01 grams (0.100 mole) of resorcinol, 20.30 grams (0.100 mole) of redistilled terephthaloyl chloride and 216 grams of o-dichlorobenzene was stirred and heated under nitrogen. The HCl which evolved during the reaction was passed into two traps each containing 200 ml. of 0.5 N sodium hydroxide solution. The reaction was heated to the reflux temperature of the dichlorobenzene, 177°–178° C. The HCl evolution began at 110° C. and was slow and continuous during the 5 hours of total reaction time at reflux. The solution remained homogeneous until the end of the reaction when the polymer began to precipitate from the orange solution. The HCl that was formed was determined by back-titration of the NaOH solution. There was formed a total of 82.8% of HCl during the 5 hours of reaction. When the heating period was over the reaction mixture was allowed to cool to room temperature and 2 liters of acetone were added. This mixture was filtered to recover the acetone insoluble polymer which was then washed with three 1-liter portions of hot acetone. The polymer was filtered and dried to give 19.73 grams (82.2%) of low molecular weight poly-m-phenylene terephthalate. This polymer melted at 274°–286° C. and had an intrinsic viscosity of 0.20 in 2,4,6-trichlorophenol at 75° C. A one-half gram sample of polymer was pressed at 310° C. and 2000 lbs./square inch pressure. The resulting film was transparent, yellow and brittle and would be unsatisfactory for forming useful articles. This shows that the melting point of polymers is no criterion of molecular weight or film forming properties since the melting of the low and high molecular weight polymers (see Example 1) are very close.

EXAMPLE 4

This example illustrates that our polymers may be made by an ester interchange reaction providing that one of our particular solvents is used. The process is not as desirable, is more time-consuming, and the products have marginal molecular weights.

In a 3-neck flask equipped with a stirrer, thermometer and Dean-Stark take-off column, were placed 19.61 grams of m-phenylene diacetate (0.101 mole), 16.61 grams of terephthalic acid (0.100 mole) and 218 grams of redistilled mixed trichlorobiphenyls. The reaction mixture was stirred and heated with a heating mantle. After 16 minutes the reaction temperature reached 281° C. and acetic acid started to distill. The reaction mixture was refluxed at 327° to 332° C. for a total of 6.72 hours. During this time the acetic acid was gradually distilled and collected. The resulting slightly viscous brown solution was allowed to cool to precipitate the polymer. The acetic acid in the distillate was determined by titration with 1 N sodium hydroxide solution. There was obtained a total of 98.5% yield of acetic acid. The polymer was isolated and washed 4 times with 1-liter portions of boiling acetone. It was filtered and dried to give 24.01 grams (99.0% yield) of poly-m-phenylene terephthalate melting at 288°–291° C. Depending on various conditions of reaction, polymers produced by this process have intrinsic viscosities in the range of 0.5 to 0.6 determined in 2,4,6-trichlorophenol at 75° C. When a sample of polymer was pressed between aluminum foil at 350° C. under a pressure of 500 lbs./square inch, the resulting quenched film was transparent but yellow in color. It was not as flexible and strong as the film produced by our acid halide process.

If it is desired to modify the molecular weight of our linear polyesters, chain stopping agents such as one or more monohydric phenols or one of more monobasic acid chlorides may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and para-cresol, the xylenols, e.g., 2,3-xylenol, 2,4-xylenol, 2,5-xylenol, 2,6-xylenol, 3,5-xylenol, etc., the hydrocarbons and hydrocarbonoxy-susbstituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and pentachlorophenols, the mono-, di-, tri-, tetra- and pentabromophenols, the mono-, di-, tri-, tetra- and pentaiodophenols, the mono-, di-, tri-, tetra- and pentafluorophenols, the mono-, di-, tri-, tetra-chlorocresols, and the mono-, di-, tri-, chloroxylenols, etc. The monohydric phenol may also be a di- or trihydric phenol in which all but one hydroxyl group has been esterified with an acid, e.g., p - hydroxyphenylbenzoate, p - hydroxyphenyltoluate, m - hydroxyphenylbenzoate, o - hydroxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them since they destroy the high temperature stability of the polymers. For the same reason, we prefer that the esters of the di- and trihydric phenols be aromatic monocarboxylic acid esters and that, if substituted, the substituent grouping be chlorine.

The superpolyesters of this invention are suitable for a wide variety of uses. As coating compositions they may be coated onto metallic or non-metallic substrates by flame spraying, melt casting, or by casting while dissolved in one of the solvents in which it is made, and thereafter evaporating the solvent at an elevated temperature and at reduced pressure. The hot solution of the solvent may be forced through a spinneret into a heated drying tower, preferably maintained at reduced pressure to form filaments and fibers, or the molten polymer may be forced through spinnerets by well known techniques to form filaments and fibers. In both cases the formed filament may be cold drawn to structurally orient the polymer in the direction of the fiber axis to increase the tensile strength. The fibers so formed may be formed into yarns or used to form fiber matting. Alternatively, the superpolyesters may be cast from solution or from the melt of the polymer, extruded through a die, or otherwise sheeted to form a continuous film of the superpolyester. These films may be oriented by cold drawing in either one or both of their major dimensions, to orient the polymer molecules in the plane of the film. For best properties, it is well to form a balanced film by orienting in both directions. It is to be understood that the cold drawing of either the film or fiber involves any stretching and/or rolling of the film below the melting point of the polymer. Preferably, the cold-drawing is done above the second-order transition temperature of the polymer. The amount of stretching and/or rolling is usually sufficient to increase the dimensions to at least twice the original length in the case of fibers, and to twice the surface area of the plane in the case of a film. The oriented film is heat-set between 200°–300° C. but preferably 200°–250° C. while maintained under tension. As the examples have illustrated, the products formed by heat and pressure may be allowed to cool slowly without becoming translucent or opaque and rigid. Instead of allowing an object to cool slowly, it may also be cooled rapidly, for example by quenching in cold water or in a blast of cold air. In either case, the material is transparent and amorphous. If this amorphous material is heated above its second-order transition point, but below its softening point, e.g., to a temperature in the range of 200°–300° C., but preferably 200°–250° C., the amorphous state is unstable and the film crystallizes. However, the film remains clear and flexible. The effect of this crystallization is to cause the density of the polymer to increase and for the actual physical dimensions to decrease. This same effect would be noticed if the polymer was extruded in the form of tubing and quenched. This shrinkage can be utilized to advantage, for example, in the preparation of an insulated electrical conductor shown in FIG. 1. In the case of the film, electrical conductor 1 is wound with the film in the form of a tape in a spiral fashion with either the adjacent edges abutting each other or overlapping to produce insulating layer 2. In the case of tubing, the tubing is slipped onto electrical conductor 1 to provided insulation layer 2. In both cases, the film or tubing is shrunk tightly onto electrical conductor 1 by heating insulation layer 2 to a temperautre in the range of 200°–300° C., but preferably 200°–250° C.

Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. They may also be used to laminate or adhere glass and metal surfaces to themselves, to each other, or to a like surface. Two mating glass objects may be heat-sealed vacuum-tight by inserting an interlayer of the superpolyester either as a powder, a film, or as a surface coating between two glass surfaces to be joined. Pressure or vacuum is applied to the assembly after it is heated to the softening point of the superpolyester to firmly adhere the two glass surfaces together. This process may be used for forming vacuum-tight seals between two mating glass surfaces, such as for making cathode ray tubes, and other devices, as disclosed and claimed in an application of Day et al., Serial No. 33,129, filed concurrently herewith and assigned to the same assignee as the present invention.

Other valuable uses for the superpolyesters of our invention will be readily apparent to those skilled in the art. Also, many apparently widely different embodiments such as the adding of pigments, fillers, stabilizers, plasticizers, etc. may be made to modify the properties of the polymers without departing from the spirit and scope of the invention. It is therefore to be understood that changes may be made in the particular embodiments of the invention described which are within the full intended scope of the invention as defined by the appended claims.

What we claim as new and desire to secure by Letters Patent of the United States is:

1. A soluble, fusible, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C., said superpolyesters being capable of being formed under heat and pressure into tough transparent flexible articles.

2. The superpolyester of claim 1 wherein the p-phenylene terephthalate is from 10 to 20 mol percent of the polymer.

3. A soluble, fusible, linear superpolyester consisting essentially of m-phenylene terephthalate having an intrinsic viscosity of at least 0.5 measured at 75° C.

4. A fiber comprising a soluble, fusible, crystalline, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C., said fiber having been cold drawn to structurally orient the polymer in the direction of the fiber axis.

5. A film comprising a soluble, fusible, amorphous, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C.

6. A film comprising a soluble, fusible, crystalline, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C.

7. The film of claim 6 which has been cold drawn in at least one of its two major dimensions to structurally orient the polymer in at least one direction in the plane of the film.

8. The process of preparing an essentially transparent, soluble, fusible, crystalline, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C., which comprises heating a quenched amorphous form of said superpolyester to a temperature of from 200° to 300° C. until equilibrium of the crystalline state is essentially established.

9. An insulated electrical conductor comprising an electrical conductor having on its surface a soluble, fusible, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C.

10. The process of making an insulated electrical conductor which comprises covering the electrical conductor with a soluble, fusible, amorphous, linear superpolyester consisting essentially of m-phenylene terephthalate units interspersed with from 0 to 30 mol percent of p-phenylene terephthalate units based on the total m-phenylene terephthalate and p-phenylene terephthalate units, the intrinsic viscosity of said superpolyester being at least 0.5 measured at 75° C., and thereafter causing the superpolyester to shrink onto the electrical conductor by heating said superpolyester to a temperature in the range of 200° to 300° C.

References Cited by the Examiner
UNITED STATES PATENTS

| | | | |
|---|---|---|---|
| 2,595,343 | 5/52 | Drewitt et al. | 260—47 |
| 3,023,192 | 2/62 | Shivers | 260—75 |

FOREIGN PATENTS

| | | |
|---|---|---|
| 1,175,362 | 11/58 | France. |

WILLIAM H. SHORT, *Primary Examiner.*

H. N. BURSTEIN, P. E. MANGAN, LEON J. BERCOVITZ, *Examiners.*